United States Patent [19]
Miyata et al.

[11] Patent Number: 5,791,041
[45] Date of Patent: Aug. 11, 1998

[54] DEVICE FOR PRODUCING BATTERY ELECTRODES AND METHOD FOR PRODUCING THE SAME

[75] Inventors: Kyosuke Miyata, Katano; Yoshimitu Kaneda, Moriguchi; Takashi Yoneda, Toyonaka, all of Japan

[73] Assignee: Matsushita Electric Industrial Co., Ltd., Osaka, Japan

[21] Appl. No.: 649,766

[22] Filed: May 15, 1996

[30] Foreign Application Priority Data

May 22, 1995 [JP] Japan ................. 7-122245

[51] Int. Cl.$^6$ ............................................. H05K 3/00
[52] U.S. Cl. ................. 29/829; 29/623.1; 29/746; 429/94
[58] Field of Search ............... 72/135; 29/623.1, 29/623.5, 623.4, 730, 825; 429/94; 242/56.1

[56] References Cited

U.S. PATENT DOCUMENTS

| | | |
|---|---|---|
| 3,373,060 | 3/1968 | Gray . |
| 3,734,778 | 5/1973 | Huf et al. . |
| 4,559,700 | 12/1985 | Sugalski et al. ............ 29/623.1 |
| 4,709,472 | 12/1987 | Machida et al. ............ 29/623.1 |
| 4,802,275 | 2/1989 | Freluche .................... 29/623.4 |
| 5,017,442 | 5/1991 | Watanabe et al. ............. 429/94 |
| 5,434,017 | 7/1995 | Berkowitz et al. ............ 429/94 |
| 5,439,760 | 8/1995 | Howard et al. ............... 429/94 |
| 5,486,215 | 1/1996 | Kelm et al. ............... 29/623.1 |

FOREIGN PATENT DOCUMENTS

| | | |
|---|---|---|
| 0283813 | 9/1988 | European Pat. Off. . |
| 0655793 | 5/1995 | European Pat. Off. . |
| 437549B2 | 7/1987 | Japan . |

Primary Examiner—W. Donald Bray
Attorney, Agent, or Firm—Watson Cole Stevens Davis, P.L.L.C.

[57] ABSTRACT

Superimposing strip layers including a positive electrode strip and a negative electrode strip, which are put into layers together with a separator strip which is put between the electrode strips, are spirally wound around an outer circumference of a bobbin having an end cross section similar in shape to a center hole of a spiral electrode to form a substantially circular center hole in the spiral electrode while extracting the bobbin.

5 Claims, 4 Drawing Sheets

DEVICE FOR PRODUCING BATTERY ELECTRODES AND METHOD FOR PRODUCING THE SAME

BACKGROUND OF THE INVENTION

1. Field of the Invention

The present invention relates to a device for producing a battery electrodes comprising a positive electrode strip, a negative electrode strip and a separator strip, all of which are spirally wound. The present invention also relates to a method for producing the same.

2. Description of the Prior Art

Various methods for producing spiral battery electrodes have been proposed. In Japanese Patent publication JP-B2-4-37549 and EP 288 813 there are disclosed typical examples of such methods. A conventional method similar to the methods disclosed in the above publications will be described with reference to FIGS. 6 and 7. A pair of bobbin pieces having a semi-circular cross section are combined into a single bobbin 1 with an insulator strip such as a separator 2 being put therebetween and then being attached thereto. Then, the bobbin 1 is turned so that the insulator strip is spirally wound around the outer circumference of the bobbin 1. The bobbin 1 is further turned so that a superimposing strip consisting of the separator 2, a positive electrode strip 3 and a negative electrode strip 4 is spirally wound around the circumference of the bobbin 1 to form a spirally wound body (coil). The coil is inserted into a cylindrical metal case 6, and then the bobbin 1 is extracted from the coil to produce a spiral electrodes.

In the following producing step, a welding apparatus is inserted into the center hole 9 of the spiral electrodes in order to weld a lead portion on the negative side of the spiral electrode to the inside of the bottom of the cylindrical metal case 6. In such a case, a "bent portion" of the separator 2 in the center hole 9 as shown in FIG. 7 often interferes with the welding apparatus, so that an inferior battery electrode is produced. Further, EP 655793 discloses a method for producing an electrode assembly in which an anode and a cathode are wound together in a unidirectional winding having substantially straight sides by using a correspondingly shaped mandrel.

SUMMARY OF THE INVENTION

It is an object of the present invention to provide a battery electrode having a hole of predetermined shape at a center thereof which solves the above-mentioned problem 1 wherein the hole does not complicate a construction of the battery electrode and does not interfere with a welding apparatus.

Another object of the invention is to provide a method for producing a battery electrode including a step of extracting a bobbin while forming a center hole of the battery electrode having a desired shape.

BRIEF DESCRIPTIONS OF THE DRAWINGS

DESCRIPTION OF THE PREFERRED EMBODIMENTS

The present invention will be described below in further detail by way of two examples with reference to the accompanying drawings.

Figure 1:
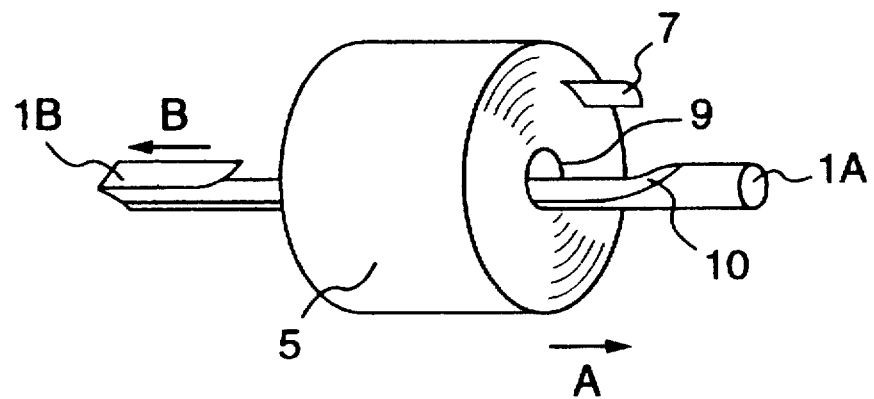
FIG. 1 is a schematic illustration of a spiral electrode manufactured by means of a bobbin according to a first embodiment of the present invention.
Figure 2:
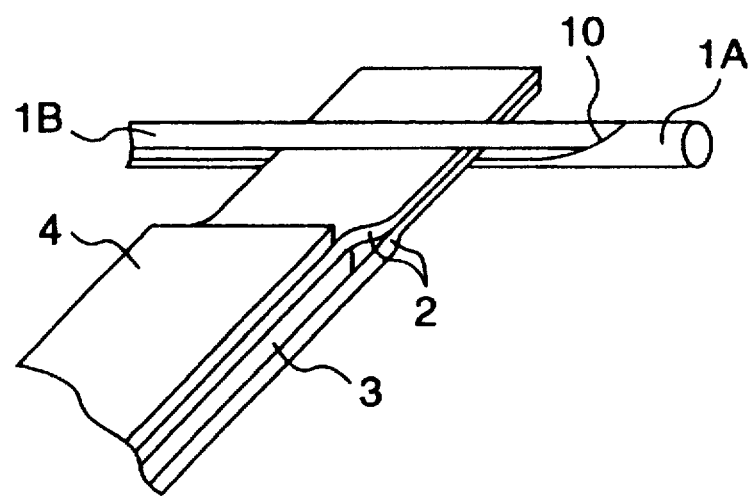
FIG. 2 is a schematic illustration of a method for manufacturing a spiral electrodes by means of the bobbin according to the first embodiment of the present invention.
Figure 3:
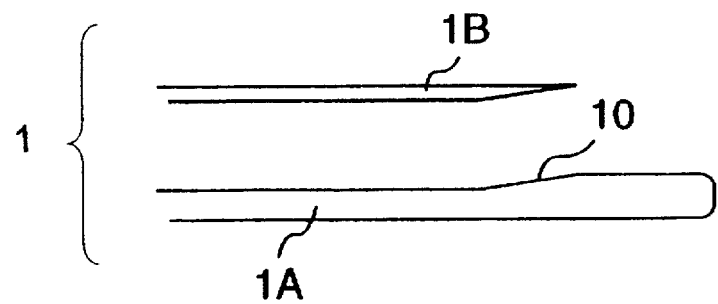
FIG. 3 is a side view of the bobbin according to the first embodiment of the present invention.
Figure 4:
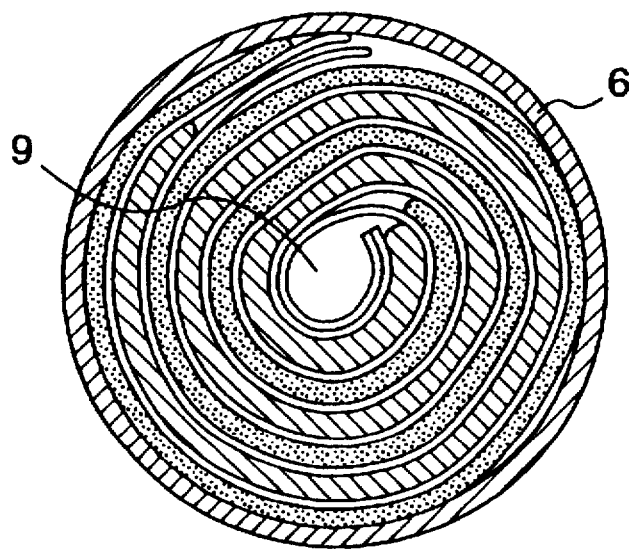
FIG. 4 is a cross-sectional view of a electrode manufactured by means of the bobbin according to the first embodiment of the present invention.

Referring first to a first embodiment of the present invention shown in FIGS. 1–3 inclusive, a bobbin 1 comprises one piece 1A of the bobbin 1 and the other piece 1B of the bobbin 1, the one piece 1A having one portion of semi-circular cross section, around which portion an electrode is spirally wound, and the other portion of a circular cross section with a diameter of 3 mm at a tip thereof, and the other piece 1B having a semi-circular cross section that forms a circular cross section with a diameter of 3 mm when the other piece 1B is placed over the one piece 1A at a bobbin slope 10 of the one piece 1A.

A separator strip 2, a positive electrode strip 3, and a negative electrode strip 4 are piled up together and then spirally wound around the outer circumference of the bobbin 1 to form a spiral electrode 5. As shown in FIG. 1, after the spiral electrode is completed, the other piece 1B is first extracted from the spiral electrode 5 in the direction indicated by an arrow B, and secondly the spiral electrode 5 is removed from the one piece 1A toward the direction indicated by an arrow A. The center hole 9 of the spiral electrode 5 is formed to be substantially circular in shape since the end of the one piece 1A has a circular cross section as shown in FIG. 1.

Figure 6:
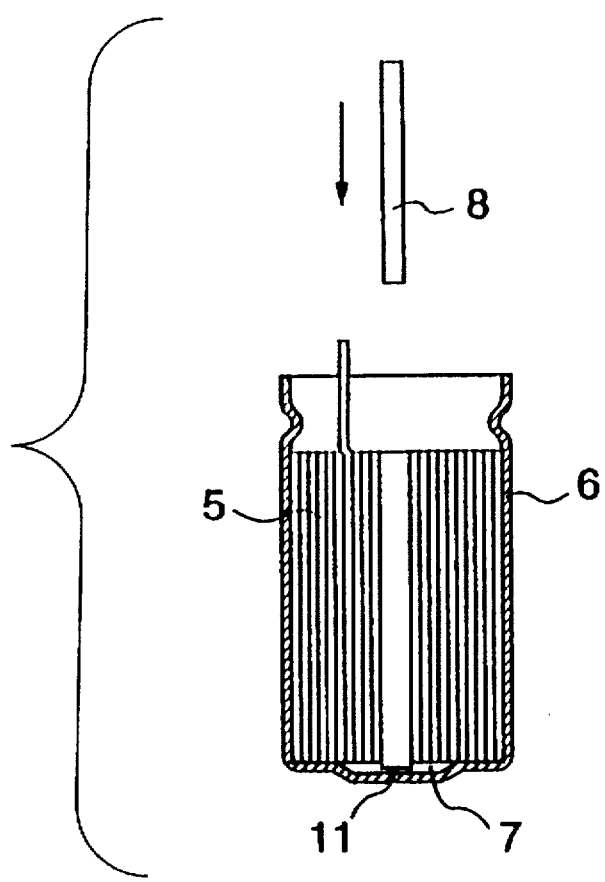
FIG. 6 is a schematic illustration of a manufacturing step of welding a lead portion on the negative side of the spiral electrode to a cylindrical metal case according to the present invention.
Figure 7:
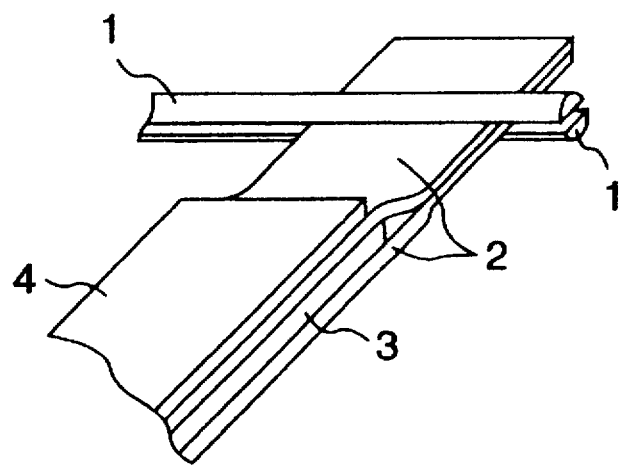
FIG. 7 is a schematic illustration of a conventional method for manufacturing a spiral electrode by means of a conventional bobbin.
Figure 8:
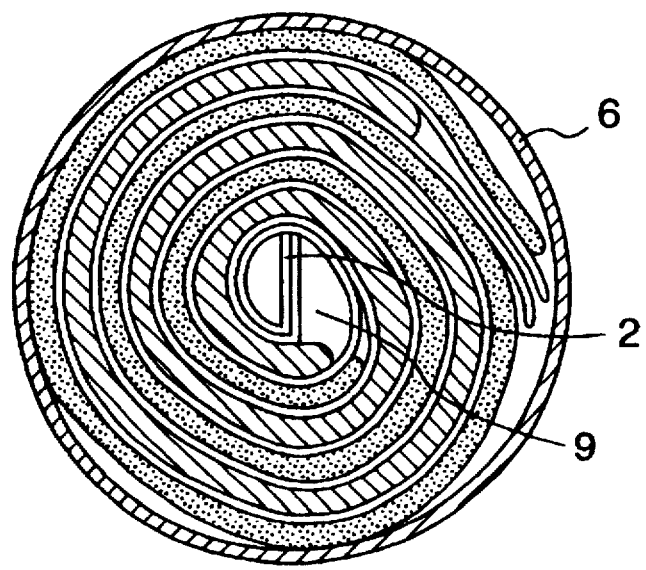
FIG. 8 is a cross-sectional view of the spiral electrode according to the conventional method.

As shown in FIG. 6, the spiral electrode 5 is inserted into a cylindrical metal case 6 with a lead portion 7 on the negative side of the spiral electrode 5 downwardly, of which the lead portion 7 is welded to the bottom inside 11 of the cylindrical metal case 6. A "bent portion" of the separator strip 2, which is left in the center hole 9 of the spiral electrode 5, and the deformation of the center hole 9 itself may cause the separator 2 or the spiral electrode 5 to interfere with a welding apparatus 8, so that an inferior battery electrode is produced. According to the embodiment of the present invention, such defects can be prevented. The tapered part of the bobbin 1 prevents the separator 2 from being unnecessarily put between the bobbin pieces 1A, 1B and facilitates extraction of the bobbin when forming the spiral electrode 5.

Figure 5:
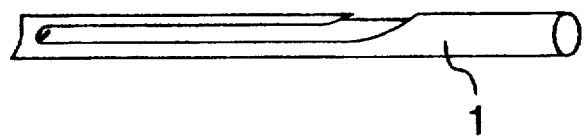
FIG. 5 is a schematic illustration of a bobbin according to a second embodiment of the present invention.

FIG. 5 shows a second embodiment of the present invention. A bobbin 1 having a guide groove, in which an inclined surface for receiving the separator strip 2 is formed. An insulator strip such as the separator strip 2 is put between the guide groove of the bobbin 1 and attached to the guide groove. The bobbin 1 is turned so that the insulator strip is spirally wound around the outer circumference thereof to form a spiral electrode. The bobbin is then extracted from the spiral electrode, so that the center hole of the bobbin is formed to be substantially circular in shape without the "bent portion" of the separator strip 2.

In the first and second embodiments, the center hole has substantially a circular shape, however, it may have any other shape such as a rectangular shape or an elliptical shape. In the various embodiments, the bobbin consists of two pieces or a single piece, however, it may consist of more than three pieces.

If the cross section of the end of the bobbin is not equivalent in shape with that of the center hole, it is possible to form the center hole into a circular shape by extracting the bobbin from the electrode while turning the bobbin.

One thousand spiral electrodes were produced by the method of the first embodiment, and the same number of the spiral electrodes were produced by a conventional method. The spiral electrodes produced by both methods were respectively inserted into a cylindrical iron case, and their lead portion of nickel on the negative side of the spiral electrodes were welded to the inside of the cylinder iron cases. The proportion of rejects due to the interference of the welding apparatus with the separator strip 2 during welding was respectively measured.

Under a copper alloy with an outer diameter of 2.8 mm is connected to a capacitor regenerative type welder, the lead portion is welded under a pressure of 5 Kg at a current of 1.38 KA during 6.8 msec. An electrode was considered to be acceptable if fractures are found in the lead portion on the negative side of the electrodes and the lead portion is found to break at a load of 1.2 Kg or more in a tension test. Table 1 gives the results.

|  | Proportion of rejects when welding the negative terminal side lead and the inside of the cylindrical iron case |
|---|---|
| Manufacturing method according to first embodiment | 3% |
| Conventional manufacturing method | 12% |

What is claimed is:

1. A bobbin for producing a spiral battery electrode comprising a positive electrode strip, a negative electrode strip and a separator strip, said bobbin comprising:
   (a) a winding portion of a first cross-sectional shape for attaching thereto said separator strip and for spirally winding said electrode strips with said separator strip disposed therebetween around an outer circumference of said bobbin to produce said spiral battery electrode;
   (b) an end portion having a second cross-sectional shape differing from said first cross-sectional shape of said winding portion and comprising means for leaving a center hole having a desired shape in said spiral battery electrode when said bobbin is extracted from said spiral battery electrode; and
   (c) a tapered portion arranged between said end portion and said winding portion for facilitating extraction of said bobbin from said spiral battery electrodes.

2. A bobbin as in claim 1, wherein said second cross-sectional shape of said end portion is one of a circular shape, a triangular shape and an elliptical shape.

3. A bobbin as in claim 1, wherein said winding portion comprises a guide groove in which said separator strip is positioned to attach the separator strip to the bobbin to enable said bobbin to effect the spiral winding of said electrode strips with said separator strip disposed therebetween around the outer circumference of the bobbin.

4. A bobbin for producing a spiral battery electrode comprising a positive electrode strip, a negative electrode strip and a separator strip, said bobbin comprising:
   (a) a first piece comprising:
      (i) a first winding portion having a first cross-sectional shape;
      (ii) a first end portion having a second cross-sectional shape differing from said first cross-sectional shape; and
      (iii) a first tapered portion disposed between the end portion and the winding portion; and
   (b) a second piece comprising:
      (i) a second winding portion having said first cross-sectional shape;
      (ii) a second end portion having said first cross-sectional shape; and
      (iii) a second tapered portion for engaging said first tapered portion of said first piece;
   said first and second winding portions for attaching the separator strip therebetween and for spirally winding the electrode strips with said separator strip disposed therebetween around an outer circumference of the bobbin to produce the spiral battery electrode;
   said first end portion comprising means for leaving a center hole having a desired shape in said spiral battery electrode when said bobbin is extracted from said spiral battery electrode; and
   said first and second tapered portions facilitating extraction of the first and second pieces from the spiral battery electrode by extracting the first and second pieces therefrom in opposite directions.

5. A method for producing a spiral battery electrode comprising a negative electrode strip, a positive electrode strip and a separator strip disposed therebetween, said method comprising the steps of:
   (a) providing a bobbin for producing a spiral battery electrode comprising a positive electrode strip, a negative electrode strip and a separator strip, said bobbin comprising:
      (i) a winding portion of a first cross-sectional shape for attaching thereto said separator strip and for spirally winding said electrode strips with said separator strip disposed therebetween around an outer circumference of said bobbin to produce said spiral battery electrode;
      (ii) an end portion having a second cross-sectional shape differing from said first cross-sectional shape of said winding portion and comprising means for leaving a center hole having a desired shape in said spiral battery electrode when said bobbin is extracted from said spiral battery electrode; and
      (iii) a tapered portion arranged between said end portion and said winding portion for facilitating extraction of said bobbin from said spiral battery electrodes;
   (b) attaching a bent portion of said separator strip to said winding portion of said bobbin;
   (c) spirally winding said negative electrode strip, said positive electrode strip and said separator strip around an outer circumference of said bobbin of said winding portion; and
   (d) forming a center hole of a desired cross-sectional shape in the spiral battery electrode by extracting said bobbin from said spiral battery electrode by passing said tapered portion and said end portion through said spiral battery electrode to thereby displace said bent portion outwardly in a radial direction of said spiral electrode.

* * * * *